(12) United States Patent
Ait Sab et al.

(10) Patent No.: US 11,101,885 B2
(45) Date of Patent: Aug. 24, 2021

(54) SUPERVISORY SIGNAL PATHS FOR AN OPTICAL TRANSPORT SYSTEM

(71) Applicant: Alcatel Submarine Networks, Nozay (FR)

(72) Inventors: Omar Ait Sab, Arpajon (FR); Ludivine Moirot, Rungis (FR)

(73) Assignee: ALCATEL SUBMARINE NETWORKS, Nozay (FR)

( * ) Notice: Subject to any disclaimer, the term of this patent is extended or adjusted under 35 U.S.C. 154(b) by 0 days.

(21) Appl. No.: 16/617,719

(22) PCT Filed: May 4, 2018

(86) PCT No.: PCT/EP2018/061511
§ 371 (c)(1),
(2) Date: Nov. 27, 2019

(87) PCT Pub. No.: WO2018/210586
PCT Pub. Date: Nov. 22, 2018

(65) Prior Publication Data
US 2020/0127735 A1 Apr. 23, 2020

(30) Foreign Application Priority Data
May 17, 2017 (EP) .................................... 17305570

(51) Int. Cl.
*H04B 10/02* (2006.01)
*H04B 10/077* (2013.01)
(Continued)

(52) U.S. Cl.
CPC ....... *H04B 10/0777* (2013.01); *H04B 10/297* (2013.01); *H01S 3/06704* (2013.01)

(58) Field of Classification Search
CPC .............. H04B 10/0777; H04B 10/297; H01S 3/06704
(Continued)

(56) References Cited

U.S. PATENT DOCUMENTS

| 6,414,769 B1 * | 7/2002 | Meli | .................. H04J 14/0209 398/79 |
| 6,708,004 B1 | 3/2004 | Homsey | |

(Continued)

FOREIGN PATENT DOCUMENTS

| EP | 0981215 A2 | 2/2000 |
| EP | 1591768 A1 | 11/2005 |

(Continued)

OTHER PUBLICATIONS

"Spectral Grids for WDM Applications: DWDM Frequency Grid", Series G: Transmission Systems and Media, Digital Systems and Networks Transmission Media and Optical Systems Characteristics—Characteristics of Optical Systems, ITU-T G.694.1 Recommendation, Feb. 2012, 16 pages.

(Continued)

*Primary Examiner* — Mohammad R Sedighian
(74) *Attorney, Agent, or Firm* — Loza & Loza, LLP; Jessica Smith

(57) ABSTRACT

A bidirectional optical repeater having two unidirectional optical amplifiers and a supervisory optical circuit connected to optically couple the corresponding unidirectional optical paths. In an example embodiment, the supervisory optical circuit provides three pathways therethrough for supervisory optical signals, the first pathway being from the output of the first optical amplifier to the input of the second optical amplifier, the second pathway being between the input of the first optical amplifier and the input of the second optical amplifier, and the third pathway being from the output of the (Continued)

second optical amplifier to the input of the first optical amplifier. The pathways are arranged such that the remote monitoring equipment of the corresponding optical transport system can use optical time-domain reflectometry to determine and monitor, as a function of time, the individual gains of the first and second optical amplifiers.

20 Claims, 5 Drawing Sheets

(51) Int. Cl.
*H04B 10/297* (2013.01)
*H01S 3/067* (2006.01)

(58) Field of Classification Search
USPC .......................................................... 398/177
See application file for complete search history.

(56) References Cited

U.S. PATENT DOCUMENTS

| | | | |
|---|---|---|---|
| 8,280,253 B2 | 10/2012 | Genay et al. | |
| 8,502,964 B2 | 8/2013 | Wang et al. | |
| 8,805,183 B2 | 8/2014 | Dvir | |
| 8,837,938 B2 | 9/2014 | Liu et al. | |
| 8,942,556 B2 | 1/2015 | Zhao et al. | |
| 9,008,503 B2 | 4/2015 | Urban et al. | |
| 9,036,991 B2 | 5/2015 | Aguren | |
| 9,042,721 B2 | 5/2015 | Randel et al. | |
| 9,143,228 B2 | 9/2015 | Sandstrom | |
| 9,170,173 B2 | 10/2015 | Perron et al. | |
| 9,240,836 B1 | 1/2016 | Chen | |
| 9,310,274 B2 | 4/2016 | Nagel et al. | |
| 9,341,543 B2 | 5/2016 | Viswanathan | |
| 2005/0226614 A1* | 10/2005 | Ogiwara | H04B 10/071 398/37 |
| 2009/0324249 A1 | 12/2009 | Zhang | |
| 2011/0216996 A1 | 9/2011 | Rogers | |
| 2012/0136660 A1 | 5/2012 | Harman et al. | |
| 2013/0216176 A1 | 8/2013 | Li et al. | |
| 2014/0212130 A1 | 7/2014 | Urban et al. | |
| 2014/0212131 A1 | 7/2014 | Zhang | |
| 2015/0280855 A1* | 10/2015 | Mertz | H04B 10/296 398/65 |

FOREIGN PATENT DOCUMENTS

| | | |
|---|---|---|
| EP | 2685641 A1 | 1/2014 |
| EP | 3404855 A1 | 11/2018 |

OTHER PUBLICATIONS

Bao et al., "Recent Progress in Distributed Fiber Optic Sensors", Sensors, vol. 12, No. 7, 2012, pp. 8601-8639.

Extended European Search Report received for corresponding European Patent Application No. 17305570.8, dated Oct. 27, 2017, 9 pages.

International Search Report and Written Opinion received for corresponding Patent Cooperation Treaty Application No. PCT/EP20181061511, dated Jul. 4, 2018, 13 pages.

* cited by examiner

SUPERVISORY SIGNAL PATHS FOR AN OPTICAL TRANSPORT SYSTEM

BACKGROUND

Field

The present disclosure relates to optical communication equipment and, more specifically but not exclusively, to supervisory signal paths for an optical transport system.

Description of the Related Art

This section introduces aspects that may help facilitate a better understanding of the disclosure. Accordingly, the statements of this section are to be read in this light and are not to be understood as admissions about what is in the prior art or what is not in the prior art.

Subsea network operators are facing a fast growth in bandwidth demand, in part due to the development and deployment of cloud-based services. As a result, they need to optimize the capacity and performance of their fiber-optic cable plants to enable the corresponding networks to efficiently handle the increasing data flows. Due to this need, one of the requirements to telecom equipment manufacturers is to provide the network operator(s) with a supervisory system that can be used to monitor the status of the submerged plant elements, e.g., to guarantee fault detection and diagnostics, improved maintainability, good performance characteristics throughout the plant's lifespan, upgradable capacity, and/or any other pertinent benchmarks.

SUMMARY OF SOME SPECIFIC EMBODIMENTS

At least some of the above-indicated problems in the state of the art are addressed by various embodiments of a bidirectional optical repeater having two unidirectional optical amplifiers and a supervisory optical circuit connected to optically couple the corresponding unidirectional optical paths. In an example embodiment, the supervisory optical circuit provides three pathways therethrough for supervisory optical signals, the first pathway being from the output of the first optical amplifier to the input of the second optical amplifier, the second pathway being between the input of the first optical amplifier and the input of the second optical amplifier, and the third pathway being from the output of the second optical amplifier to the input of the first optical amplifier. The pathways are arranged such that the remote monitoring equipment of the corresponding optical transport system can use optical time-domain reflectometry, e.g., to determine and monitor, as a function of time, the individual gains of the first and second optical amplifiers.

According to an example embodiment, provided is an apparatus comprising: a first optical amplifier located in a first optical path configured to transmit optical signals in a first direction; a second optical amplifier located in a second optical path configured to transmit optical signals in a second direction, the second direction being opposite to the first direction; and an optical circuit connected to optically couple the first optical path and the second optical path; and wherein the optical circuit comprises: a first optical pathway configured to direct light from an output of the first optical amplifier to an input of the second optical amplifier; and a second optical pathway configured to direct light from an input of the first optical amplifier to the input of the second optical amplifier.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Some embodiments may benefit from the use of features disclosed in the concurrently filed patent application by Omar Ait Sab, entitled "USE OF BAND-PASS FILTERS IN SUPERVISORY SIGNAL PATHS OF AN OPTICAL TRANSPORT SYSTEM," European Patent Application No. EP17305569.0 filed May 17, 2017, which is incorporated herein by reference in its entirety.

Figure 1:
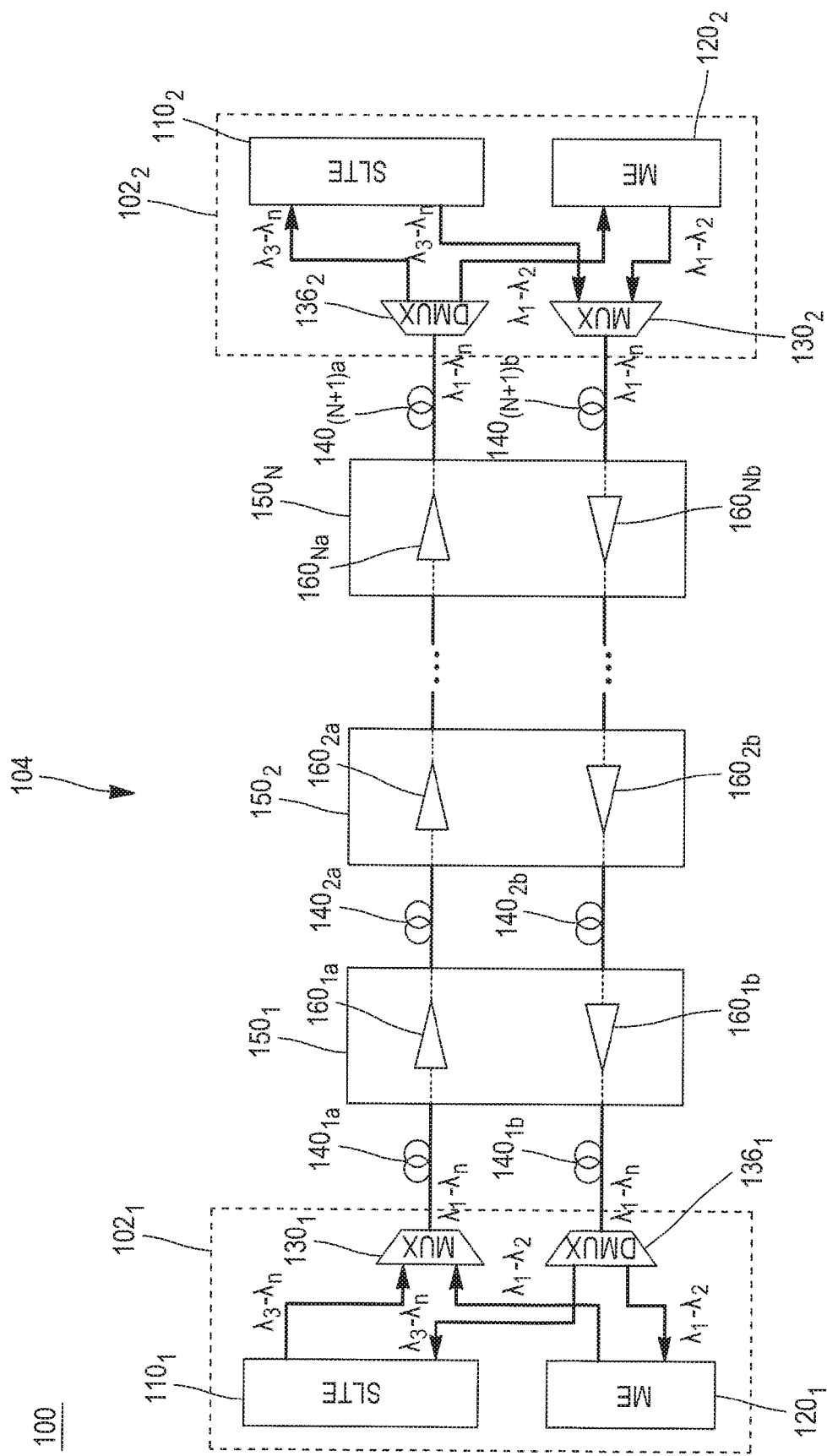
FIG. 1 shows a block diagram of an optical transport system according to an embodiment.

FIG. 1 shows a block diagram of an optical transport system 100 according to an embodiment. In the shown embodiment, system 100 comprises landing stations $102_1$ and $102_2$ connected by way of a wet plant 104. Landing stations $102_1$ and $102_2$ are typically further connected to respective terrestrial networks (not explicitly shown in FIG. 1). In an alternative embodiment, system 100 may have additional landing stations connected to wet plant 104, as known in the pertinent art, e.g., using one or more branching units (not explicitly shown in FIG. 1).

In an example embodiment, wet plant 104 comprises an undersea cable system that includes, inter alia, submersible optical repeaters $150_1$-$150_N$ serially connected by spans 140 of optical fiber, e.g., as indicated in FIG. 1, where N is a positive integer. In the shown embodiment, each span $140_i$ includes two optical fibers, which are labeled $140_{ia}$ and $140_{ib}$, respectively, where i=1, 2, . . . , N+1. The number N of optical repeaters 150 used in wet plant 104 depends on the particular embodiment and may be in the range, e.g., from 1 to ~200. A typical length of a fiber span $140_i$ may be in the range between ~50 km and ~75 km, depending on the distance between landing stations $102_1$ and $102_2$.

In the shown embodiment, an optical repeater $150_j$ comprises optical amplifiers $160_{ja}$ and $160_{jb}$, where j=1, 2, . . . , N. Optical amplifier $160_{ja}$ is configured to amplify optical signals traveling towards landing station $102_2$. Optical amplifier $160_{jb}$ is similarly configured to amplify optical signals traveling towards landing station $102_1$. In an example embodiment, an optical amplifier $160_j$ can be implemented as known in the pertinent art, e.g., using an erbium-doped fiber, a gain-flattening filter, and one or more laser-diode pumps. The laser diodes can be powered by a DC current from the corresponding shore-based power-feeding equipment (PFE, not explicitly shown in FIG. 1), fed through the center conductor(s) of the corresponding submarine cable, which also typically includes optical fibers $140_{ia}$ and $140_{ib}$.

In an alternative embodiment, optical repeaters 150 can be designed for two, three, four, or more pairs of optical fibers $140_i$ connected thereto at each side thereof. For example, an optical repeater 150 designed to be compatible with a four-fiber-pair submarine cable typically includes eight optical amplifiers 160 arranged in four amplifier pairs, each pair being similar to optical amplifiers $160_{ja}$ and $160_{jb}$.

Optical repeater $150_j$ further comprises a supervisory optical circuit (not explicitly shown in FIG. 1) that enables monitoring equipment (ME) units $120_1$ and $120_2$ located at landing stations $102_1$ and $102_2$, respectively, to monitor the operating status of the optical repeaters, e.g., as further described below. Example embodiments of the supervisory optical circuit that can be used in optical repeater $150_j$ are described in more detail below in reference to FIGS. 3-5.

In an example embodiment, each of ME units $120_1$ and $120_2$ is configured to use dedicated supervisory wavelengths (labeled $\lambda_1$ and $\lambda_2$) to generate respective supervisory signals that can be sent through the corresponding fiber(s) 140 towards the remote landing station 102. The supervisory optical circuit of each optical repeater $150_j$ is configured to loop back, in the opposite direction, at least a portion of a supervisory signal. As a result, ME unit $120_1$ can receive a looped-back supervisory signal comprising the portions of the original supervisory signal returned to that ME unit by the different supervisory optical circuits of different optical repeaters $150_1$-$150_N$. Similarly, ME unit $120_2$ can receive a looped-back supervisory signal comprising the portions of the corresponding supervisory signal returned to that ME unit by the different supervisory optical circuits of different optical repeaters $150_1$-$150_N$. The looped-back supervisory signals received by ME units $120_1$ and $120_2$ can be processed and analyzed to determine the present operating status and/or certain operating characteristics of at least some or all of optical repeaters $150_1$-$150_N$ in wet plant 104. The determined parameters may include but are not limited to: (i) input and output signal levels and the gains of some or all individual optical amplifiers $160_{ja}$ and $160_{jb}$; (ii) non-catastrophic faults in individual optical fibers $140_i$, such as any gradual loss increases therein; and (iii) catastrophic failures in individual optical repeaters $150_j$ and/or optical fibers $140_i$.

Landing station $102_1$ comprises a submarine line terminal equipment (SLTE) unit $110_1$ and ME unit $120_1$ connected to wet plant 104 by way of a wavelength multiplexer (MUX) $130_1$ and a wavelength de-multiplexer (DMUX) $136_1$ as indicated in FIG. 1. In an example embodiment, SLTE unit $110_1$ includes a wavelength-division-multiplexing (WDM) transceiver (not explicitly shown in FIG. 1) configured to transmit and receive payload-carrying optical signals using carrier wavelengths $\lambda_3$-$\lambda_n$, where n generally denotes the number of WDM channels in system 100. The number n can be in the range between ~10 and ~150.

As already indicated above, carrier wavelengths $\lambda_1$ and $\lambda_2$ are reserved for supervisory signals and are not used by SLTE unit $110_1$ for payload transmissions. Carrier wavelengths $\lambda_1$ and $\lambda_2$ can be spectrally located at an edge of the spectral range occupied by the payload-carrying WDM channels. For example, in some embodiments, both carrier wavelengths $\lambda_1$ and $\lambda_2$ can be smaller than any of carrier wavelengths $\lambda_3$-$\lambda_n$. In some other embodiments, both carrier wavelengths $\lambda_1$ and $\lambda_2$ can be larger than any of carrier wavelengths $\lambda_3$-$\lambda_n$. In some alternative embodiments, carrier wavelength $\lambda_1$ can be smaller than any of carrier wavelengths $\lambda_3$-$\lambda_n$, and carrier wavelength $\lambda_2$ can be larger than any of carrier wavelengths $\lambda_3$-$\lambda_n$.

In an example embodiment, carrier wavelengths can be selected in accordance with a frequency (wavelength) grid, such as a frequency grid that complies with the ITU-T G.694.1 Recommendation, which is incorporated herein by reference in its entirety. The frequency grid used in system 100 can be defined, e.g., in the frequency range from about 184 THz to about 201 THz, with a 100, 50, 25, or 12.5-GHz spacing of the channels therein. While typically defined in frequency units, the parameters of the grid can equivalently be expressed in wavelength units. For example, in the wavelength range from about 1528 nm to about 1568 nm, the 100-GHz spacing between the centers of neighboring WDM channels is equivalent to approximately 0.8-nm spacing. In alternative embodiments, other fixed or flexible (flex) frequency grids can be used as well.

In operation, MUX $130_1$ multiplexes the optical signals of carrier wavelengths $\lambda_3$-$\lambda_n$, generated by SLTE unit $110_1$ and the supervisory optical signals of carrier wavelengths $\lambda_1$ and $\lambda_2$, and applies the resulting multiplexed optical signal to optical fiber $140_{1a}$. DMUX $136_1$ de-multiplexes a multiplexed optical signal received from optical fiber $140_{ib}$ into two portions. The first portion has optical signals of carrier wavelengths $\lambda_3$-$\lambda_n$ and is directed to SLTE unit $110_1$. The second portion has the looped-back supervisory optical signals of carrier wavelengths $\lambda_1$ and $\lambda_2$ and is directed to ME unit $120_1$.

In an example embodiment, ME unit $120_1$ comprises an optical time-domain reflectometer (OTDR, not explicitly shown in FIG. 1) configured to optically probe wet plant 104 using carrier wavelengths $\lambda_1$ and $\lambda_2$. For example, ME unit $120_1$ can be designed to perform OTDR measurements by detecting and processing the looped-back supervisory optical signals received from optical repeaters $150_1$-$150_N$. In general, ME unit $120_1$ can be configured to use any suitable OTDR method. Some embodiments of ME unit $120_1$ may benefit from the use of at least some OTDR features and/or techniques disclosed, e.g., in U.S. Pat. Nos. 9,341,543, 9,310,274, 9,240,836, 9,170,173, 9,143,228, 9,042,721, 9,036,991, 9,008,503, 8,942,556, 8,837,938, 8,805,183, 8,502,964, and 8,280,253 and U.S. Patent Application Publication Nos. 2011/0216996, 2013/0216176, and 2014/0212130, all of which are incorporated herein by reference in their entirety. The general physical principles of different types of OTDR measurements are reviewed, e.g., in Xiaoyi Bao and Liang Chen, "Recent Progress in Distributed Fiber Optic Sensors," Sensors, 2012, vol. 12, pp. 8601-8639, which is also incorporated herein by reference in its entirety.

Landing station $102_2$ is analogous to landing station $102_1$ and comprises an SLTE unit $110_2$, ME unit $120_2$, a MUX $130_2$, and a DMUX $136_2$. The analogous elements/components of the two landing stations are labeled in FIG. 1 using the same numerical labels, but with different respective subscripts. The descriptions of SLTE unit $110_1$, ME unit $120_1$, MUX $130_1$, and DMUX $136_1$ of landing station $102_1$ given above generally apply to SLTE unit $110_2$, ME unit $120_2$, MUX $130_2$, and DMUX $136_2$, respectively, of landing station $102_2$ and are not repeated here.

In various embodiments, each of landing stations $102_1$ and $102_2$ may further include one or more of the following conventional elements/components: (i) power feeding equipment; (ii) system supervisory equipment; (iii) network management equipment; (iv) cable termination boxes; (v) network protection equipment; and (vi) various interface circuits.

In some embodiments, a single respective carrier wavelength can be used at each of ME units $120_1$ and $120_2$ to generate supervisory optical signals. In some other embodiments, more than two carrier wavelengths of the WDM set $\lambda_1$-$\lambda_n$ can be allocated for supervisory functions. A person of ordinary skill in the art will understand, without undue experimentation, how to modify MUXes 130, DMUXes 136, and/or other pertinent system components to be compatible with such alternative WDM-channel allocations for supervisory functions.

Figure 2A:
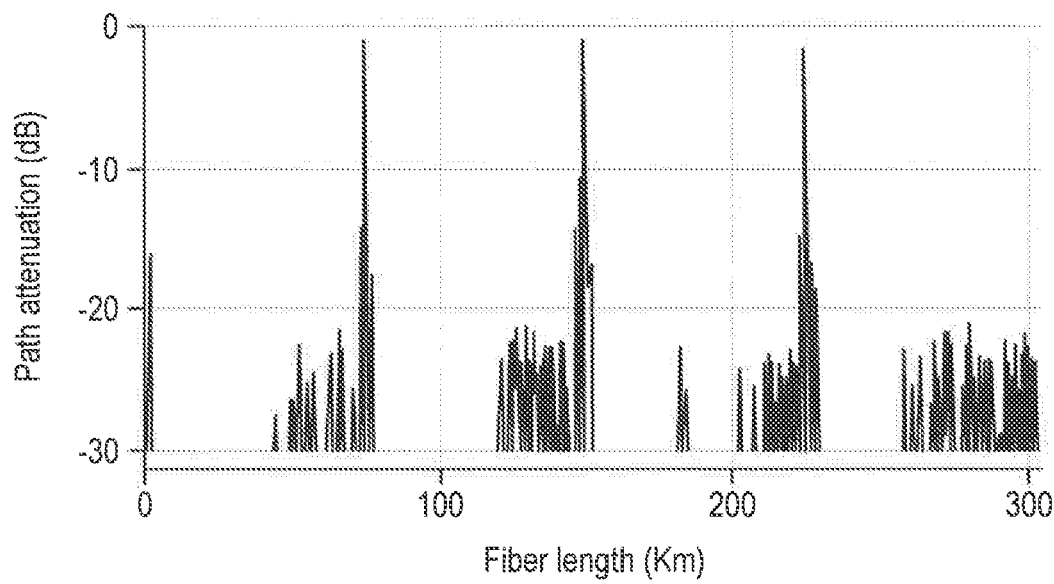
FIGS. 2A-2B graphically show example diagnostic signals that can be acquired by the monitoring equipment used in the optical transport system of FIG. 1 according to an embodiment.
Figure 2B:
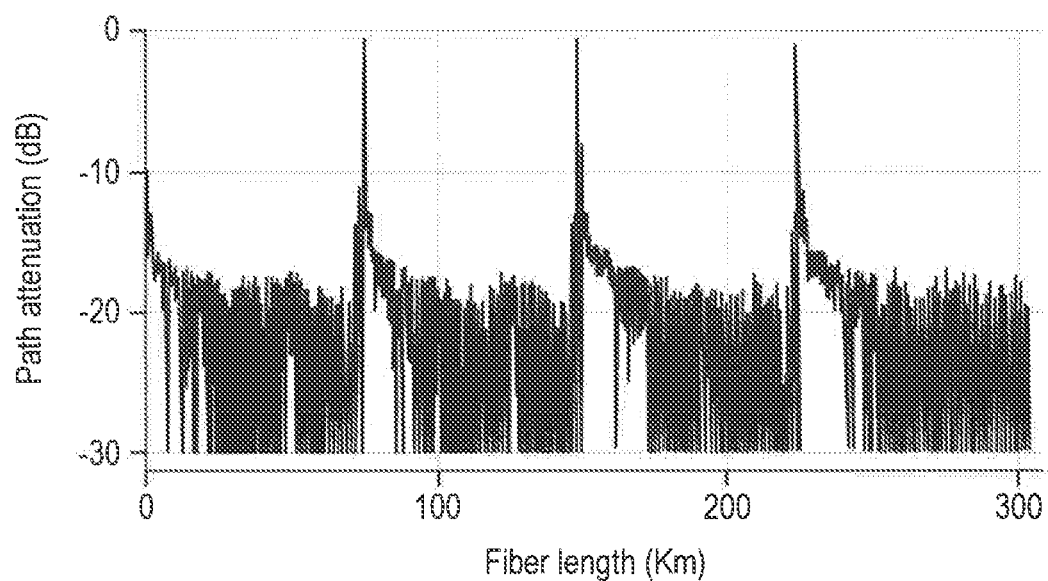

FIGS. 2A-2B graphically show example looped-back supervisory signals that can be detected by ME unit $120_1$ (FIG. 1) according to an embodiment. More specifically, FIG. 2A shows an OTDR trace acquired using carrier wavelength $\lambda_1$. FIG. 2B shows an OTDR trace similarly acquired using carrier wavelength $\lambda_2$. The OTDR traces shown in FIGS. 2A-2B correspond to an embodiment of system 100 that has four optical repeaters 150 (i.e., N=4) connected by fiber spans 140, each of which is 75-km long. Looped-back supervisory signals that can be acquired by ME unit $120_2$ (FIG. 1) in the same embodiment of system 100 may be similar to those shown in FIGS. 2A-2B, but with swapped carrier wavelengths $\lambda_1$ and $\lambda_2$.

As can be seen in FIGS. 2A-2B, the detected OTDR traces have a series of intense peaks that rise above the background noise level. It can be shown in a relatively straightforward manner that the loop-back optical paths provided by the supervisory optical circuits used in optical repeaters 150 (see FIGS. 3-5) cause the amplitude of each peak in the OTDR trace to be indicative of the power level at the corresponding port of the respective optical amplifier 160. More specifically, the amplitudes of the peaks in the OTDR trace shown in FIG. 2A are indicative of the power levels at the input ports of the respective optical amplifiers $160_{ja}$. The amplitudes of the peaks in the OTDR trace shown in FIG. 2B are similarly indicative of the power levels at the output ports of the respective optical amplifiers $160_{ja}$.

A person of ordinary skill in the art will understand that the OTDR traces acquired by ME unit $120_2$ (FIG. 1) can similarly be used to obtain input and output power levels of optical amplifiers $160_{jb}$.

In some embodiments, the OTDR traces similar to those shown in FIGS. 2A-2B can be processed using an appropriate numerical model of wet plant 104, wherein certain parameters can be iteratively adjusted to obtain the best fit to the experimentally acquired OTDR traces. The parameters of the numerical model determined in this manner can then be used to compute the corresponding characteristics of optical repeaters 150 and fiber spans 140, said corresponding characteristics not necessarily being limited to the above-mentioned input and output power levels. An example methodology that can be adapted to construct a numerical model of wet plant 104 is disclosed, e.g., in U.S. Patent Application Publication No. 2012/0136660, which is incorporated herein by reference in its entirety.

Figure 3:
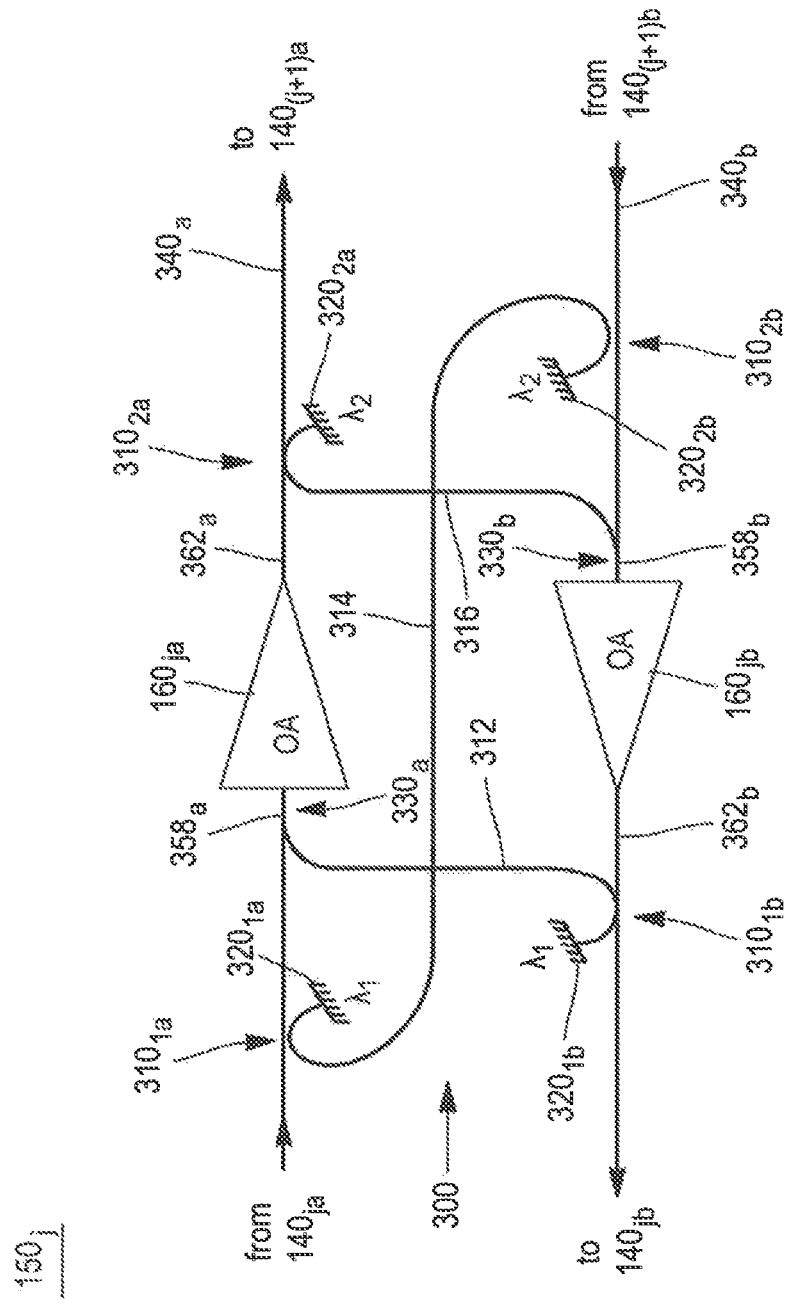
FIG. 3 shows a block diagram of an optical repeater that can be used in the optical transport system of FIG. 1 according to an embodiment.

FIG. 3 shows a block diagram of an optical repeater $150_j$ according to an embodiment. Connections of optical repeater $150_j$ to optical fibers $140_{ja}$, $140_{jb}$, $140_{(j+1)a}$, and $140_{(j+1)b}$ of wet plant 104 are also shown in FIG. 3 to better indicate the relationship between the optical circuits of FIGS. 1 and 3. Optical amplifier (OA) $160_{ja}$ of optical repeater $150_j$ (also see FIG. 1) is located in an optical path $340_a$ that connects optical fibers $140_{ja}$ and $140_{(j+1)a}$. Similarly, optical amplifier (OA) $160_{jb}$ of optical repeater $150_j$ (also see FIG. 1) is located in an optical path $340_b$ that connects optical fibers $140_{jb}$ and $140_{(j+1)b}$. Optical repeater $150_j$ also includes a supervisory optical circuit 300 that optically couples optical paths $340_a$ and $340_b$ as described in more detail below.

Circuit 300 comprises (i) four optical taps that are labeled in FIG. 3 as $310_{1a}$, $310_{1b}$, $310_{2a}$, and $310_{2b}$, respectively, and (ii) two optical combiners that are labeled in FIG. 3 as $330_a$ and $330_b$, respectively. In an example embodiment, an optical tap 310 can be implemented using a 2×2 optical coupler having a cross-coupling efficiency in the range from ~1% to ~10%. An optical combiner 330 can be implemented using a 2×1 optical coupler.

Optical tap $310_{1a}$ is located on optical path $340_a$ upstream from an input port $358_a$ of optical amplifier $160_{ja}$. Optical tap $310_{2a}$ is located on optical path $340_a$ downstream from an output port $362_a$ of optical amplifier $160_{ja}$. Optical tap $310_{1b}$ is located on optical path $340_b$ downstream from an output port $362_b$ of optical amplifier $160_{jb}$. Optical tap $310_{2b}$ is located on optical path $340_b$ upstream from an input port $358_b$ of optical amplifier $160_{jb}$. Optical taps $310_{1a}$ and $310_{2b}$ are connected to one another by way of an optical fiber or waveguide 314, as indicated in FIG. 3.

Optical combiner $330_a$ is located at input port $358_a$ of optical amplifier $160_{ja}$ and is configured to apply thereto an optical signal generated by that optical combiner at the output thereof in response to the optical signals applied to its inputs by optical fiber $140_{ja}$ and optical tap $310_{1b}$. Optical combiner $330_b$ is located at input port $358_b$ of optical amplifier $160_{jb}$ and is configured to apply thereto an optical signal generated by that optical combiner at the output thereof in response to the optical signals applied to its inputs by optical fiber $140_{(j+1)b}$ and optical tap $310_{2a}$. Optical tap $310_{1b}$ and optical combiner $330_a$ are connected to one another by way of an optical fiber or waveguide 312. Optical tap $310_{2a}$ and optical combiner $330_b$ are connected to one another by way of an optical fiber or waveguide 316.

Circuit 300 further comprises wavelength-selective reflectors $320_{1a}$, $320_{1b}$, $320_{2a}$, and $320_{2b}$ that are coupled to optical taps $310_{1a}$, $310_{1b}$, $310_{2a}$, and $310_{2b}$, respectively, as indicated in FIG. 3. Each of reflectors $320_{1a}$ and $320_{1b}$ has (i) relatively high (e.g., >50%) reflectivity in a relatively narrow (e.g., ~0.8 nm) spectral band around wavelength $\lambda_1$ and (ii) relatively low (e.g., <5%) reflectivity in the spectral regions corresponding to wavelengths $\lambda_2$-$\lambda_n$. Each of reflectors $320_{2a}$ and $320_{2b}$ similarly has (i) relatively high (e.g., >50%) reflectivity in a relatively narrow (e.g., ~0.8 nm) spectral band around wavelength $\lambda_2$ and (ii) relatively low (e.g., <5%) reflectivity in the spectral regions corresponding to wavelengths $\lambda_1$ and $\lambda_3$-$\lambda_n$.

In operation circuit 300 provides the following loop-back paths for the supervisory optical signals of carrier wavelengths $\lambda_1$ and $\lambda_2$.

A portion of a supervisory optical signal of carrier wavelength $\lambda_1$ received from optical fiber $140_{ja}$ can be looped back into optical fiber $140_{jb}$, e.g., as follows. Optical path $340_a$ directs the optical signal received through optical fiber $140_{ja}$ to optical tap $310_{1a}$. Optical tap $310_{1a}$ operates to cause the tapped optical signal to impinge onto wavelength-selective reflector $320_{1a}$ that selectively reflects the $\lambda_1$ component thereof and essentially absorbs all other spectral components thereof. The reflected $\lambda_1$ component travels through optical fiber 314 to optical tap $310_{2b}$ that operates to couple a portion of that component into optical path $340_b$. Optical path $340_b$ then directs the coupled portion to optical amplifier $160_{jb}$, where the latter undergoes optical amplification. The resulting amplified signal of carrier wavelength $\lambda_1$ is then directed from output port $362_b$ of optical amplifier $160_{jb}$ to optical fiber $140_{jb}$.

A portion of a supervisory optical signal of carrier wavelength $\lambda_2$ received from optical fiber $140_{ja}$ can be looped back into optical fiber $140_{jb}$, e.g., as follows. Optical path $340_a$ directs the optical signal received through optical fiber $140_{ja}$ to optical amplifier $160_{ja}$, where the latter undergoes optical amplification. The resulting amplified signal is directed from output port $362_a$ of optical amplifier $160_{ja}$ to optical tap $310_{2a}$. Optical tap $310_{2a}$ operates to cause the tapped optical signal to impinge onto wavelength-selective reflector $320_{2a}$ that selectively reflects the $\lambda_2$ component thereof and essentially absorbs all other spectral components thereof. The reflected $\lambda_2$ component travels through optical fiber 316 to optical combiner $330_b$ that applies the latter to optical amplifier $160_{jb}$. The resulting amplified signal of carrier wavelength $\lambda_2$ is then directed from output port $362_b$ of optical amplifier $160_{jb}$ to optical fiber $140_{jb}$.

A portion of a supervisory optical signal of carrier wavelength $\lambda_2$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical tap $310_{2b}$. Optical tap $310_{2b}$ operates to cause the tapped optical signal to impinge onto wavelength-selective reflector $320_{2b}$ that selectively reflects the $\lambda_2$ component thereof and essentially absorbs all other spectral components thereof. The reflected $\lambda_2$ component travels through optical fiber 314 to optical tap $310_{1a}$ that operates to couple a portion of that component into optical path $340_a$. Optical path $340_b$ then directs the coupled portion to optical amplifier $160_{ja}$, where the latter undergoes optical amplification. The resulting amplified signal of carrier wavelength $\lambda_2$ is then directed from output port $362_a$ of optical amplifier $160_{ja}$ to optical fiber $140_{(j+1)a}$.

A portion of a supervisory optical signal of carrier wavelength $\lambda_1$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical amplifier $160_{jb}$, where the latter undergoes optical amplification. The resulting amplified signal is directed from output port $362_b$ of optical amplifier $160_{jb}$ to optical tap $310_{1b}$. Optical tap $310_{1b}$ operates to cause the tapped optical signal to impinge onto wavelength-selective reflector $320_{1b}$ that selectively reflects the $\lambda_1$ component thereof and essentially absorbs all other spectral components thereof. The reflected $\lambda_1$ component travels through optical fiber 312 to optical combiner $330_a$ that applies the latter to optical amplifier $160_{ja}$. The resulting amplified signal of carrier wavelength $\lambda_1$ is then directed from output port $362_a$ of optical amplifier $160_{ja}$ to optical fiber $140_{(j+1)a}$.

In some embodiments, the following approximation can be used to obtain the individual gains of optical amplifiers $160_{ja}$ and $160_{jb}$ of the optical repeater $150_j$ shown in FIG. 3 using the OTDR measurements graphically illustrated in FIGS. 2A-2B. The described approximation illustrates some benefits and advantages provided by the disclosed embodiments of optical repeater $150_j$ with respect to the state of the art. As already indicated above, more-sophisticated signal-processing methods can be used to obtain additional information about the state of wet plant 104, thereby accruing additional benefits and/or advantages with respect to the state of the art.

The above-mentioned approximation relies on the assumption that circuit 300 has the same optical loss for each of the above-described loop-back paths for both wavelengths $\lambda_1$ and $\lambda_2$. The approximation further relies on the assumption that the gains of optical amplifiers $160_{ja}$ and $160_{jb}$ are spectrally flat and do not depend on the signal wavelength. The approximation further relies on the assumption that the supervisory optical signals of both carrier wavelengths $\lambda_1$ and $\lambda_2$ have the same power level P at the remote end of optical fiber $140_{ja}$ configured to feed optical repeater $150_j$.

Let $P_{in}$ and $P_{out}$ denote the power levels at input port $358_a$ and output port $362_a$, respectively, of optical amplifier $160_{ja}$. Using the above-indicated assumptions, $P_{in}$ and $P_{out}$ can be expressed using Eqs. (1)-(2):

$$P_{in} = P - A_{ja} + G_b - A_{jb} \tag{1}$$

$$P_{out} = P - A_{ja} + G_a + G_b - A_{jb} \tag{2}$$

where $A_{ja}$ is the signal attenuation in optical fiber $140_{ja}$; $G_a$ and $G_b$ are the gains of optical amplifiers $160_{ja}$ and $160_{jb}$, respectively; and $A_{jb}$ is the signal attenuation in optical fiber $140_{jb}$. It is evident from Eqs. (1)-(2) that the gain $G_a$ of optical amplifier $160_{ja}$ can be obtained by determining the difference between $P_{out}$ and $P_{in}$, i.e.:

$$G_a = P_{out} - P_{in} \tag{3}$$

As already indicated above, the values of $P_{in}$ and $P_{out}$ can be experimentally measured using the amplitudes of the corresponding peaks in the OTDR traces analogous to those shown in FIGS. 2A-2B. It follows then that the OTDR traces measured by ME unit $120_1$ using carrier wavelengths $\lambda_1$ and $\lambda_2$ can be used in a relatively straightforward manner to obtain the present-time values of the individual gains for all of optical amplifiers $160_{1a}$-$160_{Na}$ in wet plant 104.

A person of ordinary skill in the art will understand that the OTDR traces measured by ME unit $120_2$ using carrier wavelengths $\lambda_1$ and $\lambda_2$ can similarly be used to obtain the present-time values of the individual gains for all of optical amplifiers $160_{1b}$-$160_{Nb}$ in wet plant 104.

The above-indicated ability to obtain and monitor, as a function of time, the individual gains of optical amplifiers $160_{1a}$-$160_{Na}$ and $160_{1b}$-$160_{Nb}$ is advantageous, e.g., because, unlike circuit 300, conventional optical supervisory circuits used in submersible optical repeaters typically do not allow unambiguous determination of the individual amplifier gains and, instead, allow the system operator to only measure some indicator value that depends on two or more individual amplifier gains in some convoluted manner. The above-indicated ability to obtain and monitor the individual gains of optical amplifiers $160_{1a}$-$160_{Na}$ and $160_{1b}$-$160_{Nb}$ can be beneficial, e.g., because it enables the system operator to take appropriate (e.g., re-configuration and/or repair) actions in a better-informed and targeted manner.

Figure 4:
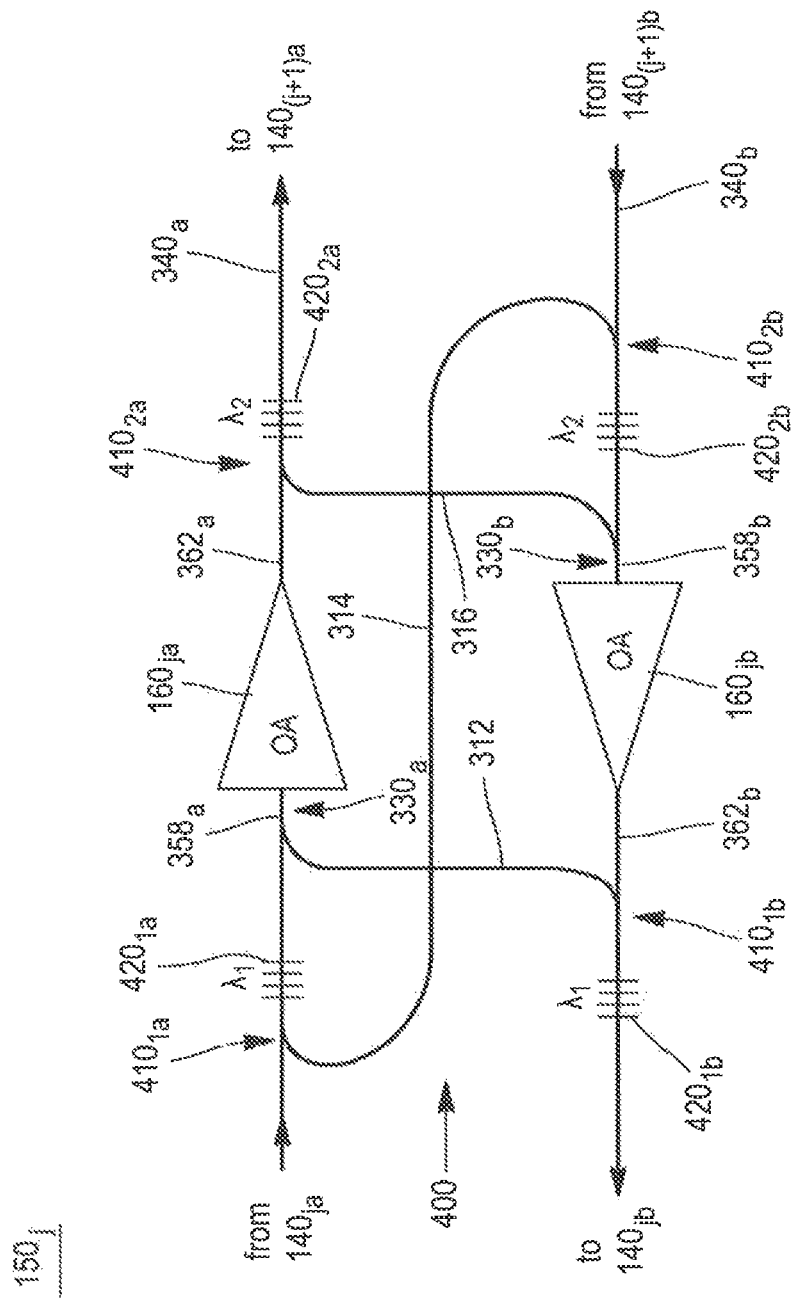
FIG. 4 shows a block diagram of an optical repeater that can be used in the optical transport system of FIG. 1 according to another embodiment.

FIG. 4 shows a block diagram of an optical repeater $150_j$ according to another embodiment. Connections of optical repeater $150_j$ to optical fibers $140_{ja}$, $140_{jb}$, $140_{(j+1)a}$, and $140_{(j+1)b}$ of wet plant 104 are also shown in FIG. 4 to better indicate the relationship between the optical circuits of FIGS. 1 and 4.

The embodiment of optical repeater $150_j$ shown in FIG. 4 is generally similar to the embodiment of optical repeater $150_j$ shown in FIG. 3, and the two embodiments use many of the same components, which are labeled in FIGS. 3 and 4 using the same labels. These components are already described above in reference to FIG. 3, and their description is not repeated here. Instead, the description given below primarily focuses on the differences between the embodiments of FIGS. 3 and 4.

In the embodiment of optical repeater $150_j$ shown in FIG. 4, supervisory optical circuit 300 is replaced by a supervisory optical circuit 400. Circuit 400 differs from circuit 300 as follows:

(i) optical taps $310_{1a}$, $310_{1b}$, $310_{2a}$, and $310_{2b}$ are replaced by 2×1 optical couplers $410_{1a}$, $410_{1b}$, $410_{2a}$, and $410_{2b}$, respectively;

(ii) wavelength-selective reflectors $320_{1a}$, $320_{1b}$, $320_{2a}$, and $320_{2b}$ are removed; and (iii) Bragg reflectors $420_{1a}$, $420_{1b}$, $420_{2a}$, and $420_{2b}$ are inserted into optical paths $340_a$ and $340_b$, as indicated in FIG. 4.

In an example embodiment, each of Bragg reflectors $420_{1a}$ and $420_{1b}$ operates to reflect between ~1% and ~10% of the light in a narrow band around wavelength $\lambda_1$ and to pass through the rest of the received light. Each of Bragg reflectors $420_{2a}$ and $420_{2b}$ similarly operates to reflect between ~1% and ~10% of the light in a narrow band around wavelength $\lambda_2$ and to pass through the rest of the received light.

In operation circuit 400 provides the following loop-back paths for the supervisory optical signals of carrier wavelengths $\lambda_1$ and $\lambda_2$.

A portion of a supervisory optical signal of carrier wavelength $\lambda_1$ received from optical fiber $140_{ja}$ can be looped back into optical fiber $140_{jb}$, e.g., as follows. Optical path $340_a$ directs the optical signal received through optical fiber $140_{ja}$ to Bragg reflector $420_{1a}$. Bragg reflector $420_{1a}$ reflects a portion of the $\lambda_1$ component of that optical signal and passes through the remainder of that optical signal. Optical coupler $410_{1a}$ couples a portion of the reflected $\lambda_1$ component into optical fiber 314 that delivers it to optical coupler $410_{2b}$. Optical coupler $410_{2b}$ operates to couple a portion of the received $\lambda_1$ component into optical path $340_b$. Optical path $340_b$ then directs the coupled portion, through Bragg reflector $420_{2b}$, to optical amplifier $160_{jb}$, where the latter portion undergoes optical amplification. The resulting amplified signal of carrier wavelength $\lambda_1$ is then directed from output port $362_b$ of optical amplifier $160_{jb}$, through Bragg reflector $420_{1b}$, to optical fiber $140_{jb}$.

A portion of a supervisory optical signal of carrier wavelength $\lambda_2$ received from optical fiber $140_{ja}$ can be looped back into optical fiber $140_{jb}$, e.g., as follows. Optical path $340_a$ directs the optical signal received from optical fiber $140_{ja}$ through Bragg reflector $420_{1a}$ to optical amplifier $160_{ja}$, where the corresponding optical signal undergoes optical amplification. The resulting amplified signal is directed from output port $362_a$ of optical amplifier $160_{ja}$ to Bragg reflector $420_{2a}$. Bragg reflector $420_{2a}$ reflects a portion of the $\lambda_2$ component of that optical signal and passes through the remainder of that optical signal. Optical coupler $410_{2a}$ couples a portion of the reflected $\lambda_2$ component into optical fiber 316 that delivers it to optical combiner $330_b$. Optical combiner $330_b$ applies the received $\lambda_2$ component to optical amplifier $160_{jb}$. The resulting amplified signal of carrier wavelength $\lambda_2$ is then directed from output port $362_b$ of optical amplifier $160_{jb}$, through Bragg reflector $420_{1b}$, to optical fiber $140_{jb}$.

A portion of a supervisory optical signal of carrier wavelength $\lambda_2$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to Bragg reflector $420_{2b}$. Bragg reflector $420_{2b}$ reflects a portion of the $\lambda_2$ component of that optical signal and passes through the remainder of that optical signal. Optical coupler $410_{2b}$ couples a portion of the reflected $\lambda_2$ component into optical fiber 314 that delivers it to optical coupler $410_{1a}$. Optical coupler $410_{1a}$ operates to couple a portion of the received $\lambda_2$ component into optical path $340_a$. Optical path $340_a$ then directs the coupled portion, through Bragg reflector $420_{1a}$, to optical amplifier $160_{ja}$, where the latter portion undergoes optical amplification. The resulting amplified signal of carrier wavelength $\lambda_2$ is then directed from output port $362_a$ of optical amplifier $160_{ja}$, through Bragg reflector $420_{2a}$, to optical fiber $140_{(j+1)a}$.

A portion of a supervisory optical signal of carrier wavelength $\lambda_1$ received from optical fiber $140_{(j+1)b}$ can be looped back into optical fiber $140_{(j+1)a}$, e.g., as follows. Optical path $340_b$ directs the optical signal received from optical fiber $140_{(j+1)b}$ through Bragg reflector $420_{2b}$ to optical amplifier $160_{jb}$, where the corresponding optical signal undergoes optical amplification. The resulting amplified signal is directed from output port $362_b$ of optical amplifier $160_{jb}$ to Bragg reflector $420_{1b}$. Bragg reflector $420_{1b}$ reflects a portion of the $\lambda_1$ component of that optical signal and passes through the remainder of that optical signal. Optical coupler $410_{1b}$ couples a portion of the reflected $\lambda_1$ component into optical fiber 312 that delivers it to optical combiner $330_a$. Optical combiner $330_a$ applies the received $\lambda_1$ component to optical amplifier $160_{ja}$. The resulting amplified signal of carrier wavelength $\lambda_1$ is then directed from output port $362_a$ of optical amplifier $160_{ja}$, through Bragg reflector $420_{2a}$, to optical fiber $140_{(j+1)a}$.

Similar to circuit 300, circuit 400 enables the system operator to obtain and monitor the individual gains of optical amplifiers $160_{1a}$-$160_{Na}$ and $160_{1b}$-$160_{Nb}$, e.g., as described above in reference to FIGS. 2-3.

Figure 5:
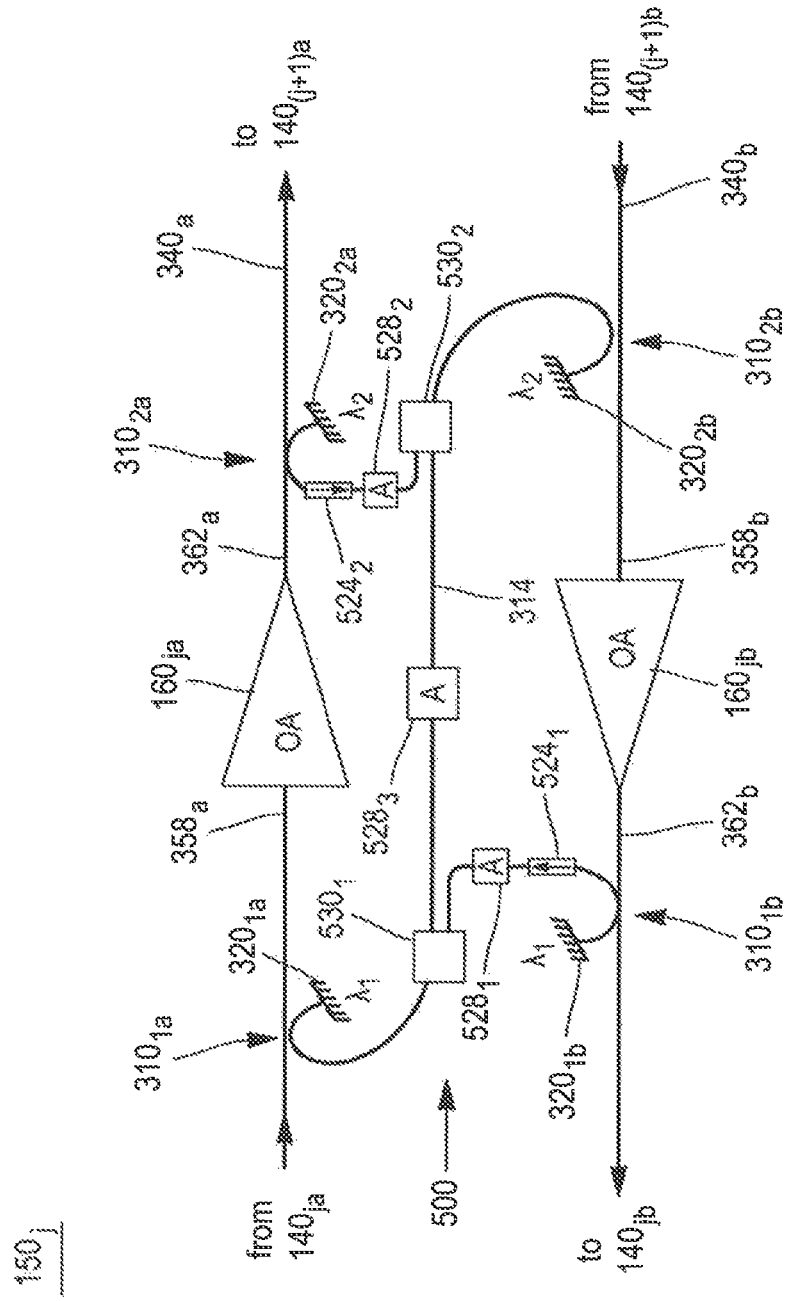
FIG. 5 shows a block diagram of an optical repeater that can be used in the optical transport system of FIG. 1 according to yet another embodiment.

FIG. 5 shows a block diagram of an optical repeater $150_j$ according to yet another embodiment. Connections of optical repeater $150_j$ to optical fibers $140_{ja}$, $140_{jb}$, $140_{(j+1)a}$, and $140_{(j+1)b}$, of wet plant 104 are also shown in FIG. 5 to better indicate the relationship between the optical circuits of FIGS. 1 and 5.

The embodiment of optical repeater $150_j$ shown in FIG. 5 is generally similar to the embodiment of optical repeater $150_j$ shown in FIG. 3, and the two embodiments use many of the same components, which are labeled in FIGS. 3 and 5 using the same labels. These components are already described above in reference to FIG. 3, and their description is not repeated here. Instead, the description given below primarily focuses on the differences between the embodiments of FIGS. 3 and 5.

In the embodiment of optical repeater $150_j$ shown in FIG. 5, supervisory optical circuit 300 is replaced by a supervisory optical circuit 500. Circuit 500 differs from circuit 300 as follows:

(i) optical combiners $330_a$ and $330_b$ are removed;

(ii) optical taps $310_{1a}$ and $310_{1b}$ are connected to one another by way of a power splitter/combiner $530_1$ that is inserted into optical fiber 314 as indicated in FIG. 5; and (iii) optical taps $310_{2a}$ and $310_{2b}$ are connected to one another by way of a power splitter/combiner $530_2$ that is inserted into optical fiber 314 as indicated in FIG. 5.

Also shown in FIG. 5 are several optional elements of circuit 500 that may be used in some embodiments. These optional elements include optical isolators $524_1$ and $524_2$, and optical attenuators $528_1$-$528_3$. Optical isolator $524_1$ and optical attenuator $528_1$ are located between optical tap $310_{1b}$ and power splitter/combiner $530_1$. Optical isolator $524_2$ and optical attenuator $528_2$ are located between optical tap $310_{2a}$ and power splitter/combiner $530_2$. Optical attenuator $528_3$ is inserted into optical fiber 314 between power splitter/combiner $530_1$ and power splitter/combiner $530_2$.

Optical isolators $524_1$ and $524_2$ and optical attenuators $528_1$-$528_3$ may be used in some embodiments to prevent spontaneous light generation in the "ring laser" that may be formed and become active due to the presence of outputto-input optical paths between optical amplifiers $160_{ja}$ and $160_{ja}$ provided by circuit 500. A person of ordinary skill in the art will understand that such spontaneous light generation may render optical repeater $150_j$ unusable, e.g., due to the high noise level caused thereby. The use of these and possibly other optional elements for the indicated purpose is not limited to the embodiment of optical repeater $150_j$ shown in FIG. 5 and, if necessary, may similarly be implemented in the embodiments of optical repeater $150_j$ shown in FIGS. 3-4.

In operation circuit 500 provides the following loop-back paths for the supervisory optical signals of carrier wavelengths $\lambda_1$ and $\lambda_2$. For brevity, the description of these loop-back paths is given for an embodiment of circuit 500 in which the above-indicated optional elements are not present.

A portion of a supervisory optical signal of carrier wavelength $\lambda_1$ received from optical fiber $140_{ja}$ can be looped back into optical fiber $140_{jb}$, e.g., as follows. Optical path $340_a$ directs the optical signal received through optical fiber $140_{ja}$ to optical tap $310_{1a}$. Optical tap $310_{1a}$ operates to cause the tapped optical signal to impinge onto wavelength-selective reflector $320_{1a}$ that selectively reflects the $\lambda_1$ component thereof and essentially absorbs all other spectral components thereof. A portion of the reflected $\lambda_1$ component reaches optical tap $310_{2b}$ by way of power splitter/combiner $530_1$, optical fiber 314, and power splitter/combiner $530_2$. Optical tap $310_{2b}$ operates to couple a portion of the received $\lambda_1$ component into optical path $340_b$. Optical path $340_b$ then directs the coupled portion to input port $358_b$ of optical amplifier $160_{jb}$, where the latter undergoes optical amplification. The resulting amplified signal of carrier wavelength $\lambda_1$ is then directed from output port $362_b$ of optical amplifier $160_{jb}$ to optical fiber $140_{jb}$.

A portion of a supervisory optical signal of carrier wavelength $\lambda_2$ received from optical fiber $140_{ja}$ can be looped back into optical fiber $140_{jb}$, e.g., as follows. Optical path $340_a$ directs the optical signal received through optical fiber $140_{ja}$ to optical amplifier $160_{ja}$, where the latter undergoes optical amplification. The resulting amplified signal is directed from output port $362_a$ of optical amplifier $160_{ja}$ to optical tap $310_{2a}$. Optical tap $310_{2a}$ operates to cause the tapped optical signal to impinge onto wavelength-selective reflector $320_{2a}$ that selectively reflects the $\lambda_2$ component thereof and essentially absorbs all other spectral components thereof. A portion of the reflected $\lambda_2$ component reaches optical tap $310_{2b}$ by way of power splitter/combiner $530_2$. Optical tap $310_{2b}$ operates to couple a portion of the received $\lambda_2$ component into optical path $340_b$. Optical path $340_b$ then directs the coupled portion to input port $358_b$ of optical amplifier $160_{jb}$, where the latter undergoes optical amplification. The resulting amplified signal of carrier wavelength $\lambda_2$ is then directed from output port $362_b$ of optical amplifier $160_{jb}$ to optical fiber $140_{jb}$.

A portion of a supervisory optical signal of carrier wavelength $\lambda_2$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical tap $310_{2b}$. Optical tap $310_{2b}$ operates to cause the tapped optical signal to impinge onto wavelength-selective reflector $320_{2b}$ that selectively reflects the $\lambda_2$ component thereof and essentially absorbs all other spectral components thereof. A portion of the reflected $\lambda_2$ component reaches optical tap $310_{1a}$ by way of power splitter/combiner $530_2$, optical fiber 314, and power splitter/combiner $530_1$. Optical tap $310_{1a}$ operates to couple a portion of the received $\lambda_2$ component into optical path $340_a$. Optical path $340_a$ then directs the coupled portion to input port $358_a$ of optical amplifier $160_{ja}$, where the latter undergoes optical amplification. The resulting amplified signal of carrier wavelength $\lambda_2$ is then directed from output port $362_a$ of optical amplifier $160_{ja}$ to optical fiber $140_{(j+1)a}$.

A portion of a supervisory optical signal of carrier wavelength $\lambda_1$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical amplifier $160_{jb}$, where the latter undergoes optical amplification. The resulting amplified signal is directed from output port $362_b$ of optical amplifier $160_{jb}$ to optical tap $310_{1b}$. Optical tap $310_{1b}$ operates to cause the tapped optical signal to impinge onto wavelength-selective reflector $320_{1b}$ that selectively reflects the $\lambda_1$ component thereof and essentially absorbs all other spectral components thereof. A portion of the reflected $\lambda_1$ component reaches optical tap $310_{1a}$ by way of power splitter/combiner $530_1$. Optical tap $310_{1a}$ operates to couple a portion of the received $\lambda_1$ component into optical path $340_a$. Optical path $340_a$ then directs the coupled portion to input port $358_a$ of optical amplifier $160_{ja}$, where the latter undergoes optical amplification. The resulting amplified signal of carrier wavelength $\lambda_1$ is then directed from output port $362_a$ of optical amplifier $160_{ja}$ to optical fiber $140_{(j+1)a}$.

Similar to circuit 300, circuit 500 enables the system operator to obtain and monitor the individual gains of optical amplifiers $160_{1a}$-$160_{Na}$ and $160_{1b}$-$160_{Nb}$, e.g., as described above in reference to FIGS. 2-3. An additional benefit of circuit 500 is that it may cause optical amplifiers $160_{ja}$ and $160_{jb}$ to have a lower effective noise figure (NF) compared to that in the embodiment of FIG. 3, wherein circuit 300 is used. This NF improvement can be realized, e.g., because circuit 500 has only one optical coupler at the input of each of optical amplifiers $160_{ja}$ and $160_{jb}$, whereas circuit 300 has two optical couplers thereat. As a result, the diverted optical power at the input of each of optical amplifiers $160_{ja}$ and $160_{jb}$ is lower in circuit 500 than in circuit 300, which tends to lower the effective noise figure.

According to an example embodiment disclosed above in reference to FIGS. 1-5, provided is an apparatus (e.g., 100, FIG. 1) comprising: a first optical amplifier (e.g., $160_{ja}$, FIG. 1) located in a first optical path (e.g., $340_a$, FIG. 3, 4, or 5) configured to transmit optical signals in a first direction; a second optical amplifier (e.g., $160_{jb}$, FIG. 1) located in a second optical path (e.g., $340_b$, FIG. 3, 4, or 5) configured to transmit optical signals in a second direction, the second direction being opposite to the first direction; and an optical circuit (e.g., 300, FIG. 3; 400, FIG. 4; or 500, FIG. 5) connected to optically couple the first optical path and the second optical path; and wherein the optical circuit comprises: a first optical pathway (e.g., 316, FIG. 3) configured to direct light from an output (e.g., $362_a$, FIG. 3) of the first optical amplifier to an input (e.g., $358_b$, FIG. 3) of the second optical amplifier; and a second optical pathway (e.g., 314, FIG. 3) configured to direct light from an input (e.g., $358_a$, FIG. 3) of the first optical amplifier to the input of the second optical amplifier.

In some embodiments of the above apparatus, the first optical pathway is coupled to a first wavelength-selective reflector (e.g., $320_{2a}$, FIG. 3; $420_{2a}$, FIG. 4) in a manner that causes the light directed from the output of the first optical amplifier to the input of the second optical amplifier to have a first wavelength (e.g., $\lambda_2$, FIGS. 3-5); and the second optical pathway is coupled to a second wavelength-selective reflector (e.g., $320_{1a}$, FIG. 3; $420_{1a}$, FIG. 4) in a manner that causes the light directed from the input of the first optical amplifier to the input of the second optical amplifier to have a second wavelength (e.g., $\lambda_1$, FIGS. 3-5) different from the first carrier wavelength.

In some embodiments of any of the above apparatus, the first wavelength-selective reflector comprises a first Bragg reflector (e.g., $420_{2a}$, FIG. 4) located in the first optical path; and the second wavelength-selective reflector comprises a second Bragg reflector (e.g., $420_{1a}$, FIG. 4) located in the first optical path.

In some embodiments of any of the above apparatus, each of the first and second optical amplifiers is configured to amplify a respective WDM signal transmitted therethrough by way of a respective one of the first and second optical paths, the respective WDM signal configured to include a component having the first wavelength, a component having the second wavelength, and a plurality of additional components, each of the additional components having a respective wavelength (e.g., $\lambda_3$-$\lambda_n$, FIG. 1) different from the first and second wavelengths; and wherein the first wavelength, the second wavelength, and the respective wavelengths are spectrally arranged in accordance with a wavelength grid.

In some embodiments of any of the above apparatus, at least some of the respective wavelengths are spectrally located between the first wavelength and the second wavelength.

In some embodiments of any of the above apparatus, at least some of the respective wavelengths are smaller than either of the first wavelength and the second wavelength.

In some embodiments of any of the above apparatus, at least some of the respective wavelengths are greater than either of the first wavelength and the second wavelength.

In some embodiments of any of the above apparatus, the optical circuit further comprises a third optical pathway (e.g., 312, FIG. 3) configured to direct light from an output (e.g., $362_b$, FIG. 3) of the second optical amplifier to the input of the first optical amplifier.

In some embodiments of any of the above apparatus, the second optical pathway is further configured to direct light from the input of the second optical amplifier to the input of the first optical amplifier.

In some embodiments of any of the above apparatus, the first optical pathway is coupled to a first wavelength-selective reflector (e.g., $320_{2a}$, FIG. 3; $420_{2a}$, FIG. 4) in a manner that causes the light directed from the output of the first optical amplifier to the input of the second optical amplifier to have a first wavelength (e.g., $\lambda_2$, FIGS. 3-5); wherein the second optical pathway is coupled to a second wavelength-selective reflector (e.g., $320_{1a}$. FIG. 3; $420_{1a}$. FIG. 4) in a manner that causes the light directed from the input of the first optical amplifier to the input of the second optical amplifier to have a second carrier wavelength (e.g., $\lambda_1$, FIGS. 3-5) different from the first wavelength; wherein the third optical pathway is coupled to a third wavelength-selective reflector (e.g., $320_{1b}$, FIG. 3; $420_{1b}$, FIG. 4) in a manner that causes the light directed from the output of the second optical amplifier to the input of the first optical amplifier to have the second wavelength (e.g., $\lambda_1$, FIGS. 3-5); and wherein the second optical pathway is further coupled to a fourth wavelength-selective reflector (e.g., $320_{2b}$, FIG. 3; $420_{2b}$, FIG. 4) in a manner that causes the light directed from the input of the second optical amplifier to the input of the first optical amplifier to have the first wavelength (e.g., $\lambda_2$, FIGS. 3-5).

In some embodiments of any of the above apparatus, the first wavelength-selective reflector comprises a first Bragg reflector (e.g., $420_{2a}$, FIG. 4) located in the first optical path; wherein the second wavelength-selective reflector comprises a second Bragg reflector (e.g., $420_{1a}$, FIG. 4) located in the first optical path; wherein the third wavelength-selective reflector comprises a third Bragg reflector (e.g., $420_{1b}$, FIG. 4) located in the second optical path; and wherein the fourth wavelength-selective reflector comprises a fourth Bragg reflector (e.g., $420_{2b}$, FIG. 4) located in the second optical path.

In some embodiments of any of the above apparatus, the apparatus further comprises monitoring equipment (e.g., $120_1$/$120_2$, FIG. 1) connected to the first and second optical paths and configured to: apply a first supervisory optical signal to the first optical path; receive a first looped-back optical signal from the second optical path, at least a portion of the first looped-back optical signal being optically coupled into the second optical path by the optical circuit in response to receiving at least a portion of the first supervisory optical signal by way of the first optical path; apply a second supervisory optical signal to the second optical path; and receive a second looped-back optical signal from the first optical path, at least a portion of the second looped-back optical signal being optically coupled into the first optical path by the optical circuit in response to receiving at least a portion of the second supervisory optical signal by way of the second optical path.

In some embodiments of any of the above apparatus, the monitoring equipment is configured to determine an optical gain of the first optical amplifier using the first looped-back optical signal (e.g., as described in reference to Eqs. (1)-(3)); and the monitoring equipment is further configured to determine an optical gain of the second optical amplifier using the second looped-back optical signal (e.g., as described in reference to Eqs. (1)-(3)).

In some embodiments of any of the above apparatus, the optical circuit further comprises a first optical power combiner (e.g., $530_2$, FIG. 5) configured to connect the first optical pathway and the second optical pathway such that the first and second optical pathways so connected have a common section (e.g., between $530_2$ and $310_{2b}$, FIG. 5); and wherein the optical circuit further comprises a second optical power combiner (e.g., $530_1$, FIG. 5) configured to connect the second optical pathway and the third optical pathway such that the second and third optical pathways so connected have a common section (e.g., between $530_1$ and $310_{1a}$, FIG. 5).

In some embodiments of any of the above apparatus, the optical circuit further comprises an optical power combiner (e.g., $530_2$, FIG. 5) configured to connect the first optical pathway and the second optical pathway such that the first and second optical pathways so connected have a common section (e.g., between $530_2$ and $310_{2b}$, FIG. 5).

In some embodiments of any of the above apparatus, the first optical amplifier, the second optical amplifier, and the optical circuit are parts of a first optical repeater (e.g., $150_j$, FIGS. 3-5).

In some embodiments of any of the above apparatus, the first optical repeater is submersible.

In some embodiments of any of the above apparatus, the apparatus further comprises one or more additional optical repeaters (e.g., $150_2$-$150_N$, FIG. 1) serially connected with the first optical repeater along the first and second optical paths.

In some embodiments of any of the above apparatus, the apparatus further comprises monitoring equipment (e.g., $120_1$, FIG. 1) connected to the first and second optical paths and configured to: apply a supervisory optical signal to the first optical path; and receive a looped-back optical signal from the second optical path, at least a portion of the looped-back optical signal being optically coupled into the second optical path by the optical circuit in response to receiving at least a portion of the supervisory optical signal by way of the first optical path.

In some embodiments of any of the above apparatus, the monitoring equipment is configured to determine an optical gain of the first optical amplifier using the looped-back optical signal (e.g., as described in reference to Eqs. (1)-(3)).

While this disclosure includes references to illustrative embodiments, this specification is not intended to be construed in a limiting sense.

For example, although various embodiments are described above in reference to wet plant 104 and submersible optical repeaters 150, the invention is not so limited. From the provided description, a person of ordinary skill in the art will understand how to make and use embodiments that are suitable for use in a terrestrial optical network, wherein at least one optical repeater 150 is located in a remote or difficult-to-access area that is not necessarily under water.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

What is claimed is:

1. An apparatus comprising:
    a first optical amplifier located in a first optical path configured to transmit optical signals in a first direction;
    a second optical amplifier located in a second optical path configured to transmit optical signals in a second direction, the second direction being opposite to the first direction; and
    an optical circuit connected to optically couple the first optical path and the second optical path; and
    wherein the optical circuit comprises:
        a first optical pathway configured to direct light that is traveling in the first direction from an output of the first optical amplifier to traveling in the second direction into an input of the second optical amplifier; and
        a second optical pathway configured to direct light that is traveling in the first direction from an input of the first optical amplifier to traveling in the second direction into the input of the second optical amplifier.

2. The apparatus of claim 1,
    wherein the first optical pathway is coupled to a first wavelength-selective reflector in a manner that causes the light directed from the output of the first optical amplifier to the input of the second optical amplifier to have a first wavelength; and
    wherein the second optical pathway is coupled to a second wavelength-selective reflector in a manner that causes the light directed from the input of the first optical amplifier to the input of the second optical amplifier to have a second wavelength different from the first wavelength.

3. The apparatus of claim 2,
    wherein the first wavelength-selective reflector comprises a first Bragg reflector located in the first optical path; and
    wherein the second wavelength-selective reflector comprises a second Bragg reflector located in the first optical path.

4. The apparatus of claim 2,
    wherein each of the first and second optical amplifiers is configured to amplify a respective WDM signal transmitted therethrough by way of a respective one of the first and second optical paths, the respective WDM signal configured to include a plurality of spectral components, each of the spectral components having a respective wavelength different from the first and second wavelengths; and
    wherein the first wavelength, the second wavelength, and the respective wavelengths are spectrally arranged in accordance with a wavelength grid.

5. The apparatus of claim 4, wherein at least some of the respective wavelengths are spectrally located between the first wavelength and the second wavelength.

6. The apparatus of claim 1, wherein the optical circuit further comprises a third optical pathway configured to direct light traveling in the second direction from an output of the second optical amplifier to the input of the first optical amplifier.

7. The apparatus of claim 6, wherein the second optical pathway is further configured to direct light traveling in the second direction from the input of the second optical amplifier to the input of the first optical amplifier;
    wherein the first optical pathway is coupled to a first wavelength-selective reflector in a manner that causes the light directed from the output of the first optical amplifier to the input of the second optical amplifier to have a first wavelength;
    wherein the second optical pathway is coupled to a second wavelength-selective reflector in a manner that causes the light directed from the input of the first optical amplifier to the input of the second optical amplifier to have a second carrier wavelength different from the first wavelength;
wherein the third optical pathway is coupled to a third wavelength-selective reflector in a manner that causes the light directed from the output of the second optical amplifier to the input of the first optical amplifier to have the second wavelength; and
wherein the second optical pathway is further coupled to a fourth wavelength-selective reflector in a manner that causes the light directed from the input of the second optical amplifier to the input of the first optical amplifier to have the first wavelength.

8. The apparatus of claim 7,
wherein the first wavelength-selective reflector comprises a first Bragg reflector located in the first optical path;
wherein the second wavelength-selective reflector comprises a second Bragg reflector located in the first optical path;
wherein the third wavelength-selective reflector comprises a third Bragg reflector located in the second optical path; and
wherein the fourth wavelength-selective reflector comprises a fourth Bragg reflector located in the second optical path.

9. The apparatus of claim 7, further comprising monitoring equipment connected to the first and second optical paths and configured to:
apply a first supervisory optical signal to the first optical path;
receive a first looped-back optical signal from the second optical path, at least a portion of the first looped-back optical signal being optically coupled into the second optical path by the optical circuit in response to receiving at least a portion of the first supervisory optical signal by way of the first optical path;
apply a second supervisory optical signal to the second optical path; and
receive a second looped-back optical signal from the first optical path, at least a portion of the second looped-back optical signal being optically coupled into the first optical path by the optical circuit in response to receiving at least a portion of the second supervisory optical signal by way of the second optical path.

10. The apparatus of claim 9,
wherein the monitoring equipment is configured to determine an optical gain of the first optical amplifier using the first looped-back optical signal; and
wherein the monitoring equipment is further configured to determine an optical gain of the second optical amplifier using the second looped-back optical signal.

11. The apparatus of claim 6,
wherein the optical circuit further comprises a first optical power combiner configured to connect the first optical pathway and the second optical pathway such that the first and second optical pathways so connected have a common section; and
wherein the optical circuit further comprises a second optical power combiner configured to connect the second optical pathway and the third optical pathway such that the second and third optical pathways so connected have a common section.

12. The apparatus of claim 1, wherein the optical circuit further comprises an optical power combiner configured to connect the first optical pathway and the second optical pathway such that the first and second optical pathways so connected have a common section.

13. The apparatus of claim 1, wherein the first optical amplifier, the second optical amplifier, and the optical circuit are parts of a first optical repeater.

14. The apparatus of claim 13, wherein the first optical repeater is submersible.

15. The apparatus of claim 1, further comprising monitoring equipment connected to the first and second optical paths and configured to:
apply a supervisory optical signal to the first optical path; and
receive a looped-back optical signal from the second optical path, at least a portion of the looped-back optical signal being optically coupled into the second optical path by the optical circuit in response to receiving at least a portion of the supervisory optical signal by way of the first optical path.

16. An apparatus comprising:
a first optical amplifier located in a first optical path configured to transmit a first plurality of optical signals in a first direction from a first optical node to a second optical node;
a second optical amplifier located in a second optical path configured to transmit a second plurality of optical signals in a second direction from the second optical node to the first optical node, the second direction being opposite to the first direction; and
an optical circuit connected to optically couple the first optical path and the second optical path, wherein the optical circuit comprises:
a first optical pathway configured to redirect at least a first optical signal of the first plurality of optical signals that is traveling in the first direction from an output of the first optical amplifier to traveling in the second direction into an input of the second optical amplifier; and
a second optical pathway configured to direct at least a second optical signal of the first plurality of optical signals that is traveling in the first direction from an input of the first optical amplifier to traveling in the second direction into the input of the second optical amplifier.

17. The apparatus of claim 16, further comprising:
a third optical pathway configured to direct a first optical signal of the second plurality of optical signals traveling in the second direction from an output of the second optical amplifier to the input of the first optical amplifier.

18. The apparatus of claim 17, further comprising:
a fourth optical pathway configured to direct a second optical signal of the second plurality of optical signals traveling in the second direction from the input of the second optical amplifier to the input of the first optical amplifier.

19. An optical node connected to a first optical path and a second optical path, wherein the optical node comprises:
a wavelength multiplexer configured to multiplex a first supervisory optical signal and a second supervisory optical signal for transmission on the first optical path;
a wavelength demultiplexer configured to demultiplex at least:
an amplified first supervisory optical signal received on the second optical path, wherein the amplified first supervisory optical signal is obtained from at least a portion of the first supervisory optical signal that is looped-back from an input of a first optical amplifier in the first optical path and to an input of a second optical amplifier in the second optical path; and an amplified second supervisory optical signal received on the second optical path, wherein the amplified second supervisory optical signal is obtained from at least a portion of the second supervisory optical signal that is looped-back from an output of the first optical amplifier in the first optical path and to the input of the second optical amplifier in the second optical path; and monitoring equipment configured to determine a gain of the first optical amplifier using the amplified first supervisory optical signal and the amplified second supervisory optical signal.

20. The optical node of claim 19, wherein the monitoring equipment is configured to determine the gain of the first optical amplifier by:

perform an optical time-domain reflectometer (OTDR) measurement on the amplified first supervisory optical signal to obtain a first OTDR trace, wherein an amplitude of a peak in the first OTDR trace is indicative of a power level at the input of the first optical amplifier in the first optical path; and perform the optical time-domain reflectometer (OTDR) measurement on the amplified second supervisory optical signal to obtain a second OTDR trace, wherein an amplitude of a peak in the second OTDR trace is indicative of a power level at the output of the first optical amplifier in the first optical path.

* * * * *